United States Patent [19]

Mashimo et al.

[11] 4,011,569
[45] Mar. 8, 1977

[54] EXPOSURE CONTROL SYSTEM FOR A CAMERA

[75] Inventors: Yukio Mashimo, Tokyo; Tadashi Ito, Yokohama, both of Japan

[73] Assignee: Canon Kabushiki Kaisha, Tokyo, Japan

[22] Filed: Sept. 30, 1975

[21] Appl. No.: 618,124

[30] Foreign Application Priority Data

Oct. 1, 1974   Japan .......................... 49-112926
Oct. 1, 1974   Japan .......................... 49-112927
Oct. 21, 1974  Japan .......................... 49-121142

[52] U.S. Cl. .................................. 354/38; 354/36; 354/60 R
[51] Int. Cl.² .......................................... G03B 7/08
[58] Field of Search ................. 354/24, 26, 28, 29, 354/30, 36, 37, 38, 40, 41, 43, 47, 48, 50, 51, 60 R

[56] References Cited

UNITED STATES PATENTS

| | | | |
|---|---|---|---|
| 3,829,867 | 8/1974 | Ono ........................................ | 354/28 |
| 3,882,511 | 5/1975 | Tsujimoto et al. .................. | 354/51 |
| 3,896,472 | 7/1975 | Yoshiyama et al. ................ | 354/51 |
| 3,899,789 | 8/1975 | Taguchi et al. ...................... | 354/51 |
| 3,945,024 | 3/1976 | Hasegawa et al. .................. | 354/38 |

*Primary Examiner*—Russell E. Adams, Jr.
*Attorney, Agent, or Firm*—Toren, McGeady and Stanger

[57] ABSTRACT

An exposure control system for a camera of the type provided with shutter preselection and diaphragm preselection automatic exposure ranges and with a manual exposure range. A switching arrangement responds to a selected range by selectively establishing one of three possible combinations of channels. These transmit photographic analog information from exposure control parameter setting means, which include means for preselection of a desired shutter time and/or diaphragm aperture to exposure determining means which have shutter and diaphragm control means, either directly or through a computer circuit. This switching arrangement is rendered less susceptible to and adapted for incorporation in a semiconductor device with integrated circuits normalized for various types of cameras including the type having an individual single exposure range and is amenable to relatively low cost unit production techniques.

17 Claims, 17 Drawing Figures

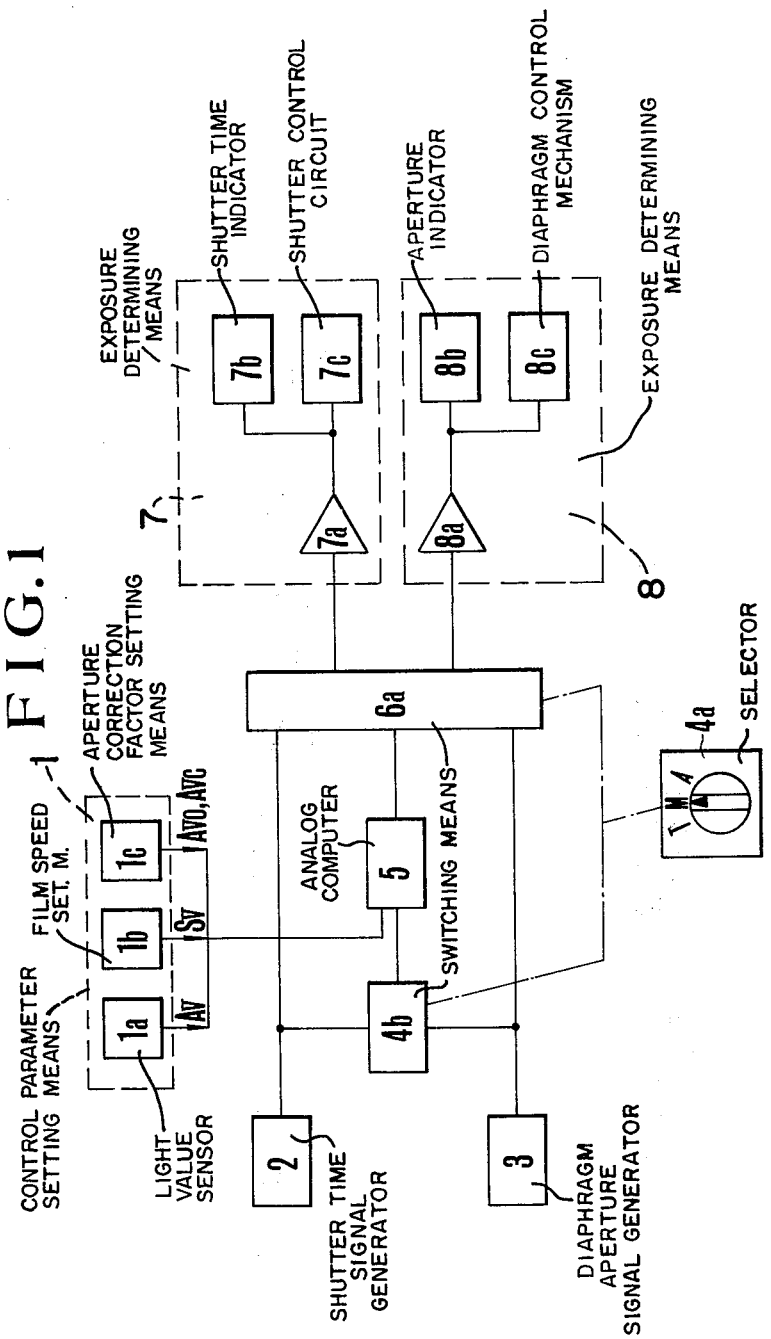

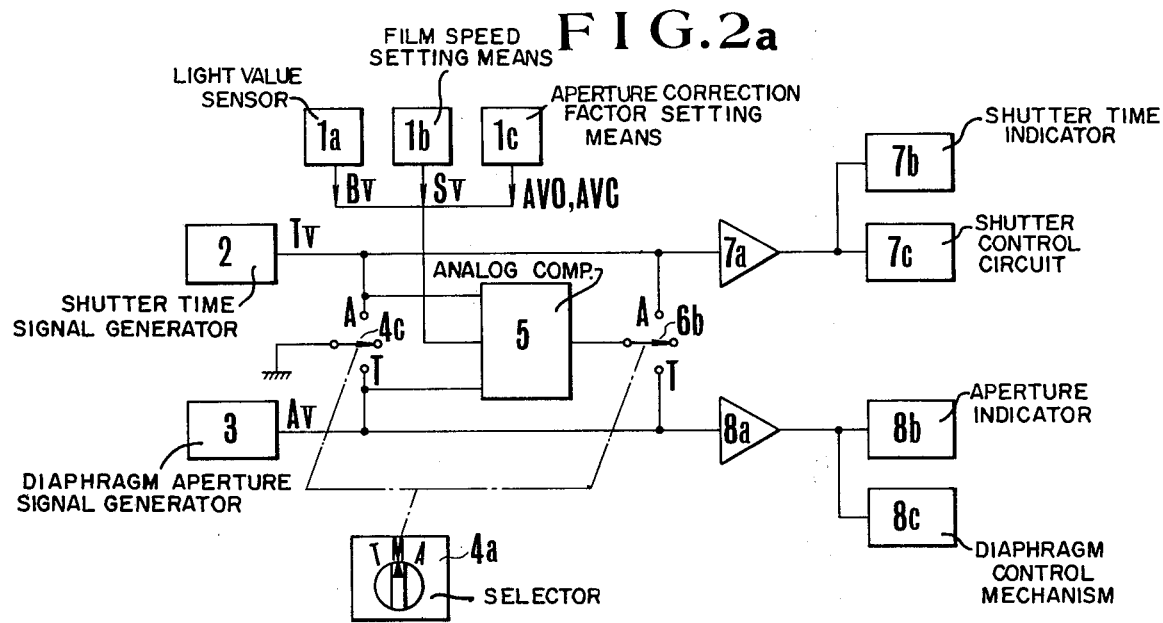
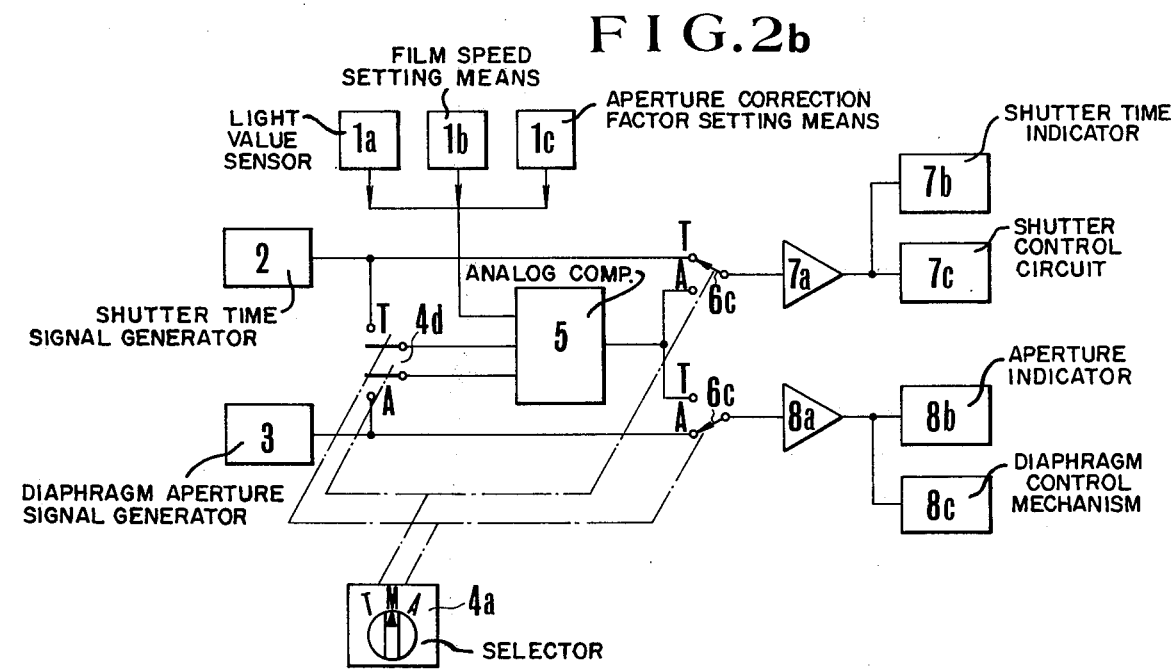

EXPOSURE CONTROL SYSTEM FOR A CAMERA

BACKGROUND OF THE INVENTION

1. Field of the Invention

This invention relates to exposure control systems for cameras, and more particularly to an exposure control system for a camera of the type provided with shutter preselection and diaphragm preselection automatic exposure ranges and with a manual exposure range. Still more particularly, it relates to a switching arrangement for selectively establishing one of three possible combinations of channels for transmiting photographic analog information between exposure control parameter setting means and exposure determining means either directly or through a computer circuit when the manual or automatic exposure range is operative respectively.

2. Description of the Prior Art

In a prior art camera of the type described when switched in the shutter preselection automatic exposure range, the shutter dial of the camera is manually operated to set into an exposure control circuit a desired shutter time in the form of an analog signal. The latter is combined by a computer, i.e. a computing device, with additional analog signals supplied from a film speed setter and a light value sensor to produce an output representative of an effective exposure aperture. This is applied to a diaphragm value indicator and which is utilized in controlling the operation of a diaphragm control. In the case of the diaphragm preselection automatic exposure range, a diaphragm ring is manually operated to set into the exposure control circuit a desired diaphragm value in the form of an analog signal. The computing device is combined with additional analog signals supplied from the film speed setter and the light value sensor to produce an output representative of an effective shutter time. The latter is applied to a shutter time indicator and is utilized in controlling operation of a shutter control. In the case of the manual exposure range, the shutter dial and diaphragm ring are manually adjusted, whereby the shutter means is controlled electrically, while the diaphragm means is set in position mechanically.

Widely accepted cameras are of the type having a single automatic exposure range, that is, either a shutter preselection automatic exposure range alone, or a diaphragm preselection automatic exposure range alone these are provided with a device which permits the photographer, who is looking through the viewfinder of the camera, to view the preselected shutter time or diaphragm aperture value as well as the pointer of an electronic exposure meter in or near the image field of the finder with the use of supplementary optical means such as prisms. A scale plate may be arranged in the finder and operatively linked with either the shutter dial, or the diaphragm ring. Most of prior art cameras of the type provided with the shutter preselection and diaphragm preselection automatic exposure ranges other than digitally controlled cameras of the same type are adapted to display the result of computation for an exposure value alone, which can be seen, upon looking into the finder. In the field of view of the finder, The provision for displaying the preselected shutter time or diaphragm aperture value in the field of view of the finder is not be made in the finder of the camera to avoid an increase in the complexity of the camera structure. Digitally controlled cameras in which photographic information is digitally processed are generally provided with digital display devices for displaying the preselected shutter time and/or diaphragm aperture values or value as well as an exposure value as the result of digital computation. However they have the disadvantage of increasing the complexity of the structures of the camera and production cost thereof because of the necessity of an analog-to-digital converter for converting the output of the light value sensor which produces an analog output signal in response to the level of brightness of an object being photographed. A digital device does however have the advantage of satisfying the need for highly accurate automatic exposure control over an extended range of light levels.

In addition to the above mentioned disadvantages of the dual range type camera has another disadvantage that the mechanism for switching the camera between the two automatic exposure ranges is associated with circuit-transfer switching means for two circuit arrangements one of which is operative in the shutter preselection exposure range, and the other in the diaphragm preselection exposure range. The switching mechanism is more complicated in structure than that employed in the single range type of cameras. This results in an increase in the possibility of malfunction of the exposure control circuit.

A further disadvantage is that the construction, arrangement and form of the switching mechanism with the circuittransfer switching means must be specially manufactured for incorporation in the camera. It must take into account the fact that the electrical conducting characteristics of the switching means are very sensitive to the formation of oxide films and deposition of dusts effected between the working members thereof, or otherwise the accuracy and reliability in aperture or shutter time control could not be stabilized with increase in the number of operations. This is so because the exposure control circuit is designed to operate with little electrical power on the order of microwatts from a miniature mercury cell or silver cell. Such a special switching mechanism is not amenable to low unit cost production techniques.

Recently, a new problem has arisen, because a rapidly everincreasing proportion of the total camera production, from first class cameras of simple construction up to super-high class cameras with systematized components therefor, have been manufactured with electronic controls. Most of these controls employ integrated circuits as the essential parts of the light value sensor, computer and switching circuit controlling operation of the shutter or diaphragm means. On the other hand, most of the camera makers have so far individually produced a wide variety of cameras including the first class cameras up to the super-high class cameras by employment of different types of cameras. At present, the monthly production of cameras of one type in the individual makers is not so large, amounting to several tens of thousands of cameras at most. Consequently, the number of integrated circuit units of one type necessary for use in certain types of cameras is not large. Thus it is difficult to reduce the production cost by mass production thereof. This is one factor in the high cost of the camera. The provision of the corresponding number of types of integrated circuit units to that of types of cameras which are to be produced in the individual camera makers is disadvantageous not only for the service department of the maker, because it has always to keep sufficient quantities of all the types of integrated circuit units in stock, but also for repairmen, because the service is timeconsuming and requires considerably detailed knowledges from them. Therefore, therefore, when the automatic exposure control systems are designed to have different types of integrated circuit units with different types of cameras, individual camera makers find it very difficult to establish smooth progress from the development of new types of cameras through the design to the manufacture along with smooth marketing routes for the products. This results in an increase in the cost of the individual cameras. Further, this problem becomes serious in the production and service of super-high class cameras which represent a relatively small percentage of the total camera production.

SUMMARY OF THE INVENTION

It is a general object of the present invention to eliminate the above mentioned conventional drawbacks and to provide an improved exposure control system for a camera.

A first object of the invention is to provide an improved exposure control system for a camera of the type provided with the shutter preselection and diaphragm preselection automatic exposure ranges and with a manual exposure range, in which photographic information is processed in the analog form, and the provision for displaying not only an exposure value but also a preselected shutter time or diaphragm aperture value can be made without causing an unduly large increase in the complexity of the structure thereof.

A second object of the invention is to provide an exposure control system for a camera of the type described, in which the switching arrangement for switching the camera between the shutter preselection and diaphragm preselection automatic exposure ranges and between the automatic and manual exposure ranges is associated with a minimized number of circuit-transfer switch elements which are usually expensive and susceptible to damages.

A third object of the present invention is to provide an exposure control system which derives a design flexibility allowing the use of common integrated circuit units with different types of cameras including medium quality cameras of the type provided with a single automatic exposure range alone, namely, either a shutter preselection automatic exposure range alone, or a diaphragm preselection automatic exposure range alone as well as high quality cameras of the dual automatic exposure range type, and which system is amenable to a relatively low cost unit production techniques with standarization of the components thereof.

Other objects and features of the present invention will become apparent from the following detailed description taken in conjunction with the accompanying drawings in which:

BRIEF DESCRIPTION OF THE DRAWINGS

FIG. 1 is a block diagram of a first embodiment of an exposure control system according to the present invention.

FIG. 2(a) is a schematic circuit diagram, partially in block form, showing a first example of switch arrangement with two circuit-transfer mechanical switch elements for selection of the operating ranges in the system of FIG. 1.

FIG. 2(b) is a similar diagram showing a second example of switch arrangement with four circuit-transfer mechanical switch elements.

DESCRIPTION OF THE PREFERRED EMBODIMENTS

Figure 2C:
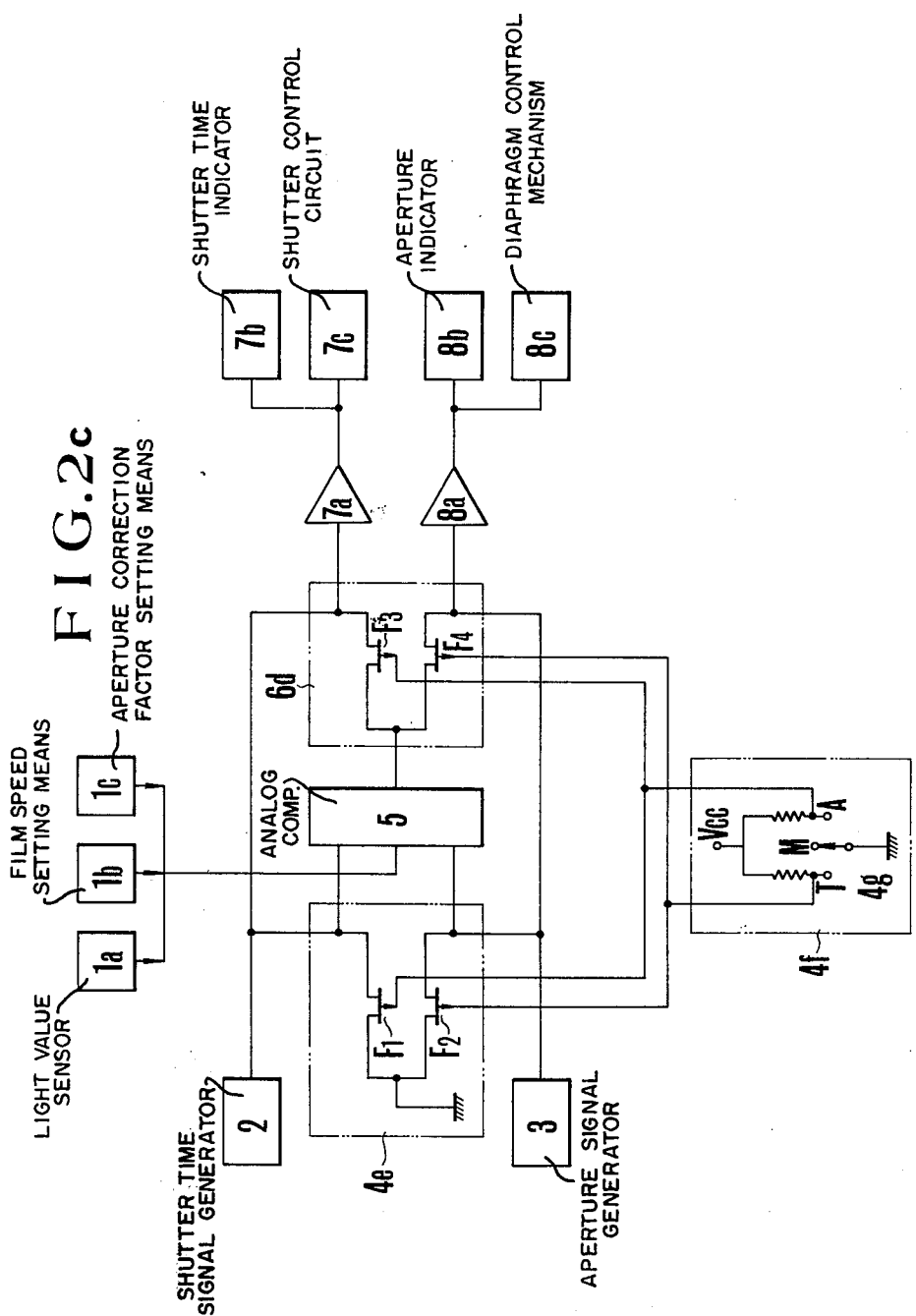
FIG. 2(c) is a similar diagram showing a third example of switch arrangement with four semi-conductor switch elements.

FIG. 1, shows one embodiment of an exposure control system for a camera of the type provided with a shutter preselection automatic exposure range and with a diaphragm preselection automatic exposure range. Here, an automatically operable exposure control parameter setting means 1, forms an output connected to a first input of an analog computer 5. A manually operable shutter time setting means having a signal generator 2 arranged upon setting of the shutter dial of the camera for producing an analog signal Tv with a magnitude proportional to the APEX value of the shutter time preselected on the shutter dial, manually operable diaphragm aperture setting means has a signal generator 3 arranged upon setting of the diaphragm ring of the camera for producing an analog signal Av with a magnitude proportional to the APEX value of the diaphragm aperture preselected on the diaphragm ring. A first circuit-transfer switching means 4b includes a pair of input terminals connected to the respective output terminals of the first and second signal generators 2 and 3 and includes a single output terminal connected to a second input terminal of computer 5. A second circuit-transfer switching means 6a includes three input terminals connected to the respective output terminals of first and second signal generators 2 and 3 and computer 5 and has two output terminals connected to the respective input terminals of first and second exposure determining means 7 and 8. The exposure control parameter setting means 1 includes a light value sensor 1a having a photosensitive element arranged to receive light passing through an objective lens of the camera for producing an analog signal with a magnitude proportional to the APEX value of the light or the level of brightness of an object being photographed. A manually operable film speed setting means 1b sets ASA sensitivity of the film used into the system. The setting is accomplished in the form of an analog signal with a magnitude proportional to the APEX value thereof. An automatically operable aperture correction factor setting means 1c produces an analog signal with a magnitude proportional to the APEX value of the maximum relative aperture ratio of the objective lens used. It also produce an analog signal with a magnitude proportional to the APEX value of the deviation of light value variation with aperture size from the linear relationship therebetween. This deviation tends to occur in a region near the fully open aperture position when the TTL light metering mode is rendered operative with the fully opened lens aperture mechanism. The first exposure determining means 7 is adapted to control operation of the shutter of camera and is shown as comprising a buffer amplifier 7a, a shutter time indicator 7b and a shutter control circuit 7c. The second exposure determining means 8 is adapted to control operation of the diaphragm of the camera and is shown as comprising a buffer amplifier 8a, a diaphragm aperture indicator 86 and a diaphragm control mechanism 8c. The first and second circuit-transfer switching means 4b and 6a are arranged to operate in synchronism with each other by a selector 4a which is shown in the form of a control knob accessible from the outside of the camera housing. However they may be mechanically linked with the shutter dial and/or the diaphragm ring. This may be done so that switching the camera between any two of the three different operating range positions designated by T, A and M, namely, the positions for the shutter preselection automatic exposure range, for the diaphragm preselection automatic exposure range and for the manual exposure range respectively is effected by manually operating the shutter dial and diaphragm ring between their adjusting position and non-adjusting positions as will be described in connection with FIG. 5.

FIG. 2(a) shows a specific example of switch arrangement for selectively establishing one of three possible combinations of analog signal transmitting channels for adaptation to the three different operating ranges. The switch arrangement includes two single pole-double throw switches 4c and 6b corresponding to the first and second circuit-transfer switching means 4b and 6a of FIG. 1 respectively. These are operated synchronously with each other and in the same sense. That is, both of the movable contacts of the respective switches 4c and 6b move together to the above positions designated upper A when the diaphragm preselection automatic exposure range is rendered operative. They move together to the lower positions designated T when the shutter preselection automatic exposure range is rendered operative from the illustrated positions for the manual exposure range. Both of the analog signals Tv and Av generated from the first and second generators 2 and 3 by setting the shutter dial and diaphragm ring to respective desired values are applied through respective buffer amplifiers 7a and 8a to the shutter and diaphragm control means 7c and 8c respectively. The preselected shutter time and diaphragm aperture values on the shutter dial and diaphragm ring are displayed by the respective display devices 7b and 8b for the photographer looking through the finder of the camera. The movable contact of the first switch 4c is grounded and the movable contact of the second switch 6b is connected to the output terminal of the analog computer 5. The camera may be switched from the manual exposure range to the shutter preselection automatic exposure range by the control knob 4a, or by moving the diaphragm ring from its manually operable range to its non-adjusting or "Auto" position situated beyond the manually operable range, while the shutter dial remains unmoved from its manually operable range. When the camera is so switched the movable contacts of the switches 4c and 6b engage the respective fixed contacts T. Thus the signal Av from the generator 3 is grounded and the output of the computer 5 is connected to the diaphragm aperture determining means 8. In this combination of channels, the signal Tv from the generator 2 is combined with signals in the analog computer, namely the signal $Bv$ ($= Bv' - Avc - Avo$) from the light value sensor 1a, the signal Sv from the film speed setting means 1b and the signal $Avc + Avo$ from the aperture correction factor setting means 1c to derive an analog output signal Av. The latter has a magnitude proportional to the APEX value of an effective exposure aperture as the result of computation, that is, $Av = (Bv' - Avc - Avo) + Sv + Avc + Avo - Tv$. The output signal Av of the computer 5 is applied through the buffer amplifier 8a to both the diaphragm aperture display device 8b and diaphragm control means 8c. When a shutter release button not shown is operated, the shutter and diaphragm control means 7c and 8c are actuated to control the period of actuation of the shutter and the size of diaphragm aperture in accordance with the preselected shutter time and with the derived exposure value respectively. In the case of the diaphragm preselection automatic exposure range, the shutter dial is removed from its manually operable range to its non-adjusting or "Auto" position. The latter is situated beyond its manually operable range. The diaphragm ring is moved from its Auto position to a desired point on the manually operable range. Thus the shutter speed signal generator 2 is connected to ground and the output of the computer 5 is connected to the shutter time determining means 7. The computer 5 performs the computation based on the formula $Tv = (Bv' - Avc - Avo) + Sv + Avc + Avo - Av$ to produce an analog output signal Tv which is applied to the shutter time determining means 7.

Figure 3:
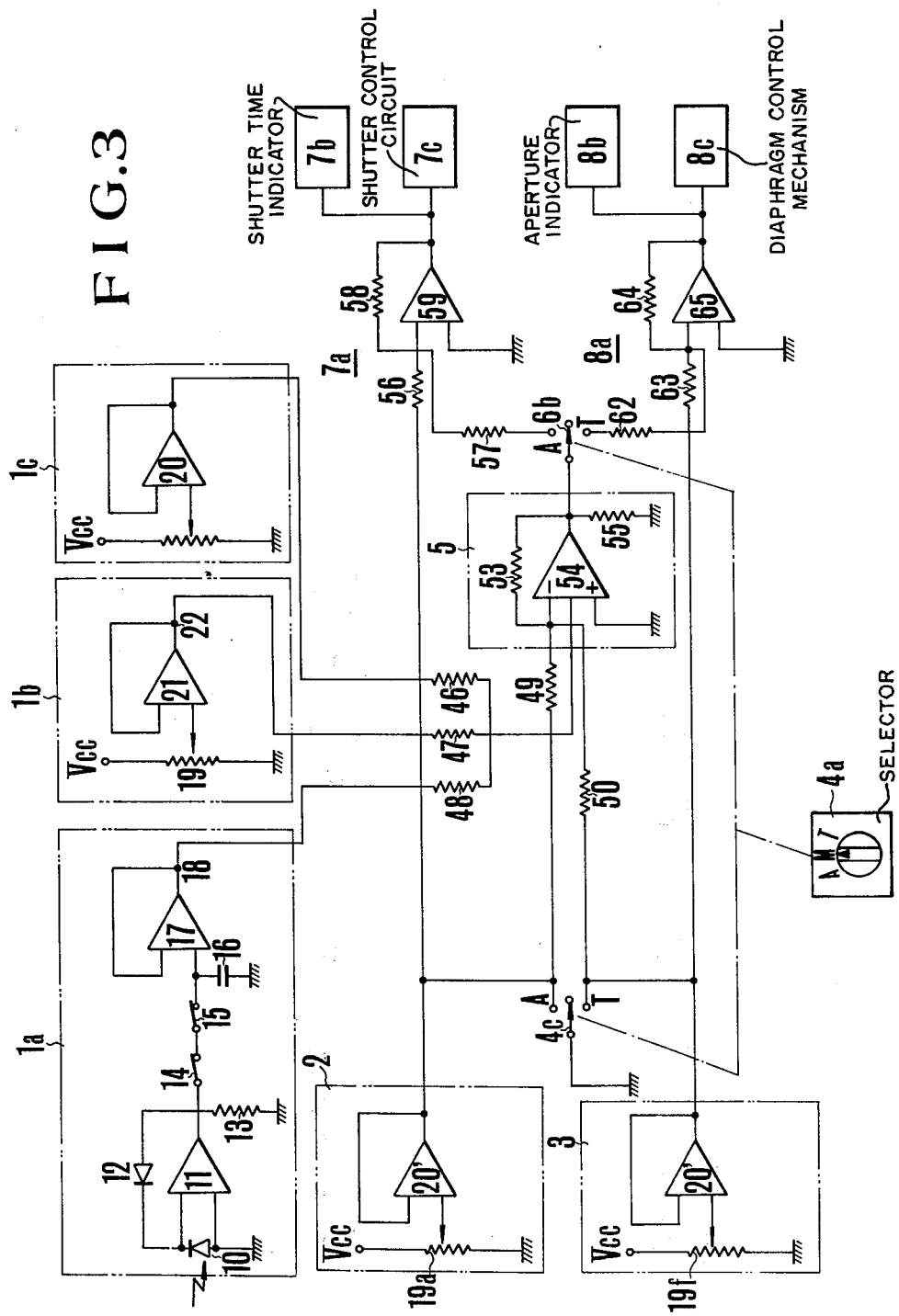
FIG. 3 is a schematic circuit diagram, partially in block form, showing the details of the system of FIG. 2(a).

FIG. 3 shows the details of the circuitry of the various blocks of the system of FIG. 2(a), each of which will next be described in detail.

The light value sensor 1a includes a photosensitive element 10 such as a silicon photodiode connected to an operational amplifier 11, a feedback diode 12 connected between the input terminal and output terminal of amplifier 11, and a resistor 13 across which an output voltage of amplifier 11 is developed as an analog signal ($Bv' - Avc - Avo$). This signal is transmitted through an EE lock switch 14 and a memory switch 15 to a memory capacitor 16 and is stored thereon. The memory switch 15 is opened just before the initiation of an upward pivoting movement of the reflex mirror not shown, when this occurs the signal stored on the capacitor 16 and having a magnitude effected just before the opening of switch 15 passes through a high impedance input amplifier 17 to the output terminal 18 of the sensor 1a.

The film speed setting means 1b comprises a variable resistor 19 arranged to be manually adjustable in accordance with the sensitivity of the used film, and a buffer amplifier 21 having an input connected to the slider of the variable resistor 19 and of which the output terminal serves as the output terminal of the film speed setting means 1b.

Figure 4:
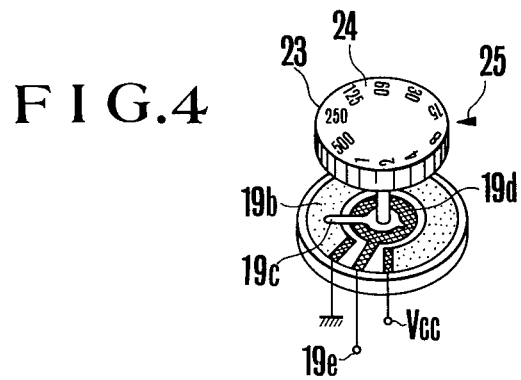
FIG. 4 is a perspective view of a shutter dial having a variable resistor arranged to provide an analog signal with a magnitude proportional to the shutter time preselected on the shutter dial usuable in the circuit of FIG. 3.

The aperture correction factor setting means 1c, shutter time setting means 2 and diaphragm aperture setting means 3 each are similar in construction and arrangement to the film speed setting means 1b. An example of construction and arrangement of the variable resistor 19 associated with the shutter dial of the camera is shown in FIG. 4. Here an acruate track 19b made of resistance material is arranged in connentric relation with the shaft of a shutter dial 23 having a shutter time scale 24 cooperative with a stationary index 25. A slider 19c extends from the shaft of the shutter dial 23 onto the resistance track 19b during application of a regulated voltage vcc across the resistance track 19b at the same time a desired shutter time graduation on the shutter dial 23 is placed in registry with the index 25. This produces produce an output signal ($-Tv$) in the form of a voltage proportional to the negative APEX value of the preselected shutter time at the output terminal 19e connected to the slider 19c. The variable resistor 19f of the diaphragm aperture setting means 3 has a function identical to that of the variable resistor 19a of the shutter time setting means 2, so that the output voltage serves as a signal ($-Av$).

The computer 5 is an adder circuit which includes an operational amplifier 54, five balancing resistors 46 through 50, with the resistors 46, 47 and 48 being connected at their one ends to a first common input terminal of the operational amplifier 54 and with the resistor 49 and 50 being connected at their one ends to a second input terminal thereof. The computer 5 also includes a feedback resistor 53 connected between the common input terminal and the output terminal of the amplifier 54, and a load resistor 55 connected between the output terminal of the amplifier 54 and ground. The resistors 48, 47 and 46 are connected at their opposite ends to the respective output terminals of the sensor 1a, setting means 1b and 1c. The resistor 49 and 50 are connected at their opposite ends to the respective output terminals of the shutter time and diaphragm aperture setting means 2 and 3 through the fixed contacts A and T of the first switch 4c respectively. The fixed contact A of the second switch 6b is connected through a resistor 57 to a common input terminal of an amplifier 59. The latter connected through a resistor 56 to the output terminal of the shutter time setting means 2. The amplifier 59 with its feedback resistor 59 constitutes the buffer amplifier 7a. The fixed contact T of the second switch 6b is connected through a resistor 62 to a common input terminal of an amplifier 65. The latter is connected through a resistor 63 to the output terminal of the diaphragm aperture setting means 3. The amplifier 65 with its feedback resistor 64 constitute the buffer amplifier 8a. The display devices 7b and 8b may be of any conventional type such as meters, analog-to-digital converters, decoders, or digital readout devices having seven segment light-emitting diodes.

The operates system of FIG. 3 is as follows. For making an exposure in the shutter preselection automatic exposure range, the shutter dial is turned to select a desired shutter time, and the diaphragm ring is set to the Auto position thereby the first and second circuit-transfer switches 4c and 6b are set to their T position. Next, when the shutter button is depressed by a first stroke to close a power switch not shown, an analog signal ($-Tv$) from the shutter time setting means 2 is applied to the operational amplifier 54 through the resistor 49. The signal passes the shutter time display device 7b through the amplifier 59. Thus the shutter time preselected on the shutter dial is displayed by the device 7b in the field of view of the finder. Responsive to the signal ($-Tv$) and signals ($Bv' - Avc - Avo$), ($Sv$) and ($Avc + Avo$), the computer 5 derives an output signal ($-Av$) as the result of computation based on the formula $-Av = (Bv' - Avc - Avo) + Sv + (Avc = Avo) - Tv$. This output signal ($-Av$) is applied through the second switch 6b and resistor 63 to the amplifier 65, so that the value of an effective exposure aperture is displayed by the device 8b. Upon further depression of the shutter button to the second stroke, the memory switch 15 is opened and the mirror begins to move from the viewing position to the non-viewing position. The diaphragm control means 8c is actuated to move the diaphragm means from its fully open position to a position for the effective exposure aperture. When the movement of the diaphragm means has been terminated, the shutter control means 7c is actuated causing the front shutter curtain to run down to the fully open position, so that the exposure is initiated. After a timed interval equal to the preselected shutter time, the rear shutter curtain runs down to the blocking position to terminate the exposure.

For making an exposure in the diaphragm preselection automatic exposure range, the diaphragm ring is turned to select a desired diaphragm value. The shutter dial is set to the Auto position. Thus the first and second switches 4c and 6b are set from their T positions to their A positions. When the shutter button is depressed by the first stroke, the signal ($-Av$) is applied from the diaphragm aperture setting means 3 to the operational amplifier 54 through the resistor 50 and to the amplifier 65 through resistor 63. Thus the diaphragm aperture value preselected on the diaphragm ring is displayed by the device 8b and the diaphragm control means 8c is actuated to adjust the diaphragm means to the setting. The computer 5 derives an output signal ($-Tv$) which is then applied to the shutter display device 7b and shutter control means 7c.

For making an exposure in the manual exposure range, the shutter dial and diaphragm ring are turned to select respective desired values. As a result, the first and second switches 4c and 6b are set to the illustrated positions in which the computer 5 is ineffective. This permits the exposure to be controlled in accordance with the preselected shutter time and diaphragm aperture.

Figure 5A:
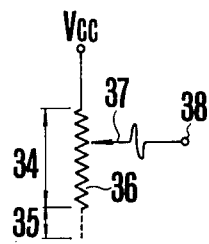
FIGS 5(a) and 5(b) are schematic views showing two examples of modification of the variable resistor of FIG. 4 in a manner to serve additionally as a first switch element.
Figure 5B:
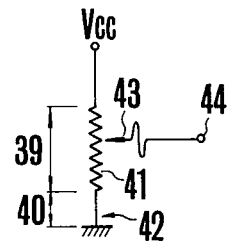

Certain changes may be made in the switch arrangement of the above system without departing from the scope of the invention. For example, the first switch 4b may be combined with either the shutter time or the diaphragm aperture setting means variable resistor 19a or 19f respectively to form a single composite member as shown in FIG. 5(a) or 5(b). In FIG. 5(a), the variable resistor 19a or 19f is modified to exhibit a resistance value adjustable portion 36 and a non-adjustable insulator portion 35 positioned adjacent the portion 36. Accordingly when the shutter dial or diaphragm ring is moved from its manually operable range to the non-adjusting position, a slider 37 is made to ride onto the insulator portion 35 from the resistance portion 36. Therefore the exposure control mode is changed from the shutter preselection to the diaphragm preselection automatic exposure range or vice versa respectively. In FIG. 5(b), the insulator portion 35 of FIG. 5(a) is replaced by a grounded conductor portion 42.

Moreover, as shown in FIG. 2(b), instead of using a single pole double throw switch 4c as the first switching means 4b of FIG. 1, a pair of single pole single throw switch elements 4d may be used to connect the respective input circuits of the computer 5 from the blocks 2 and 3, and to operate in the opposite sense to each other. Thus, when one of the two switch elements 4d is closed, the other is opened is response to operation of the control knob 4a. Also instead of using a single switch element 6d as the second switching means 6a of FIG. 1, a pair of switch elements 6c of the same type may be used. However, here the movable contacts thereof are connected to the respective exposure determining means 7 and 8 and arranged to operate synchronously with each other in response to operation of the control knob 4a and in the opposite sense to each other. That is, when the means 7 is connected to means 2, the means 8 is connected to the output of the computer 5 to permit operation of the shutter preselection automatic exposure range. When the means 8 is connected to means 3, the means 7 is connected to the output of the computer 5 to permit operation of the diaphragm preselection automatic exposure range.

Furthermore, as shown in FIG. 2(c), the first and second switching means 4b and 6a of FIG. 1 may be constructed from a pair of semi-conductor switch elements 4e and 6d respectively. The first semi-conductor switch element 4e comprises a pair of field-effect transistors $F_1$ and $F_2$ with the source electrodes thereof being connected to respective points on the connection between an output terminal of the shutter time setting means 2 and an input terminal of the computer 5 and between the output terminal of the diaphragm aperture setting means 3 and another input terminal of the computer 5 respectively, with the drain electrodes thereof being grounded, and with the substrate electrodes thereof being connected through respective fixed contacts A and T of a common change-over switch 4f and respective resistors to a potential source Vcc. The second semi-conductor switch element 6d comprises a pair of field-effect transistors F3 and F4 with the source electrodes thereof being connected to a common output terminal of the computer 5, the drain electrodes thereof being connected to the respective input terminals of the exposure determining means 7 and 8 and the substrate electrodes thereof being connected to the fixed contacts A and T of the change-over switch 4f respectively. The movable contact of the change-over switch 4f is grounded so that upon engagement with the fixed contact T or A for operation of the shutter preselection or diaphragm preselection exposure range, the transistors F1 and F3 are turned off while the transistors F2 and F4 are in the "on" state, or the vice versa respectively.

It will be appreciated that the first embodiment of the present invention provides a novel switch arrangement which when used in a conventional exposure control system for a camera of the type having only one automatically operating range imparts into the camera broadened photographic capabilities as affording two automatically operating exposure ranges. As is known in the art, however, the electrical conducting characteristics of the mechanical switching means are very sensitive to the formation of oxide films and deposition of dusts effected between the working members thereof. Therefore, it is preferable to minimize the number of mechanical switch elements necessary for switching the exposure control system between the operating ranges. An improvement in this respect is effected in a second embodiment of the present invention as will be described below.

Figure 6:
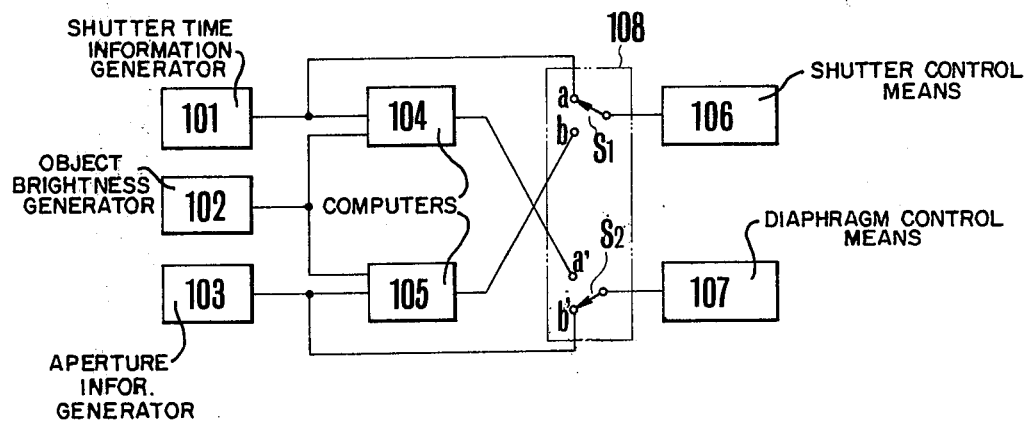
FIG. 6 is a block diagram of a second embodiment of an exposure control system according to the present invention.

FIG. 6, there is shown a second embodiment of the present invention. Here a first photographic information generator 101 generator information corresponding to the preselected shutter time. A second photographic information generator 102 generates information corresponding to the object brightness level, film speed and aperture correction factors. A third photographic information generator 103 serves for generating information corresponding to the preselected diaphragm aperture. First and second computers 104 and 105 are adapted to derive effective exposure aperture and time values based on the information supplied from the first and third generators 101 and 103 respectively as well as from the second generator 102. Shutter control means 106 selectively responsive to the outputs of the first generator 101 and the second computer 105 control the period of actuation of the shutter and diaphragm control means 107 selectively responsive to the outputs of the third generator 103 and the first computer 104 control the size of diaphragm aperture. For selection of operating ranges, there is provided a switch element assembly 108 composed of a pair of circuit-transfer mechanical switch elements $s_1$ and $S_2$ each in the form of a single pole double throw switch. The fixed contacts a and b of the first switch element $S_1$ are connected to the output terminals of the first generator 101 and the second computer 105 respectively, and the movable contact is connected to the input terminal of the shutter control means 106. The fixed contacts a' and b' of the second switch $S_2$ are connected to the output terminals of the first computer 104 and the third generator 103 respectively, and its movable contact is connected to the input terminal of the diaphragm control means 107. The first and second switch elements $S_1$ and $S_2$ are arranged to operate synchronously with each other in such a manner that when the shutter preselection automatic exposure range is operative the switches $S_1$ and $S_2$ are set in their a and a' positions respectively, and when the diaphragm preselection automatic exposure range is operative the switches $S_1$ and $S_2$ are set in their b and b' positions respectively, and when the manual exposure range is operative the switches $S_1$ and $S_2$ are set in their a and b' positions respectively. In the second embodiment of the invention, therefore, the first switching means of the first embodiment is omitted, and instead two independent computers are employed in place of the common computer of the first embodiment.

Figure 7:
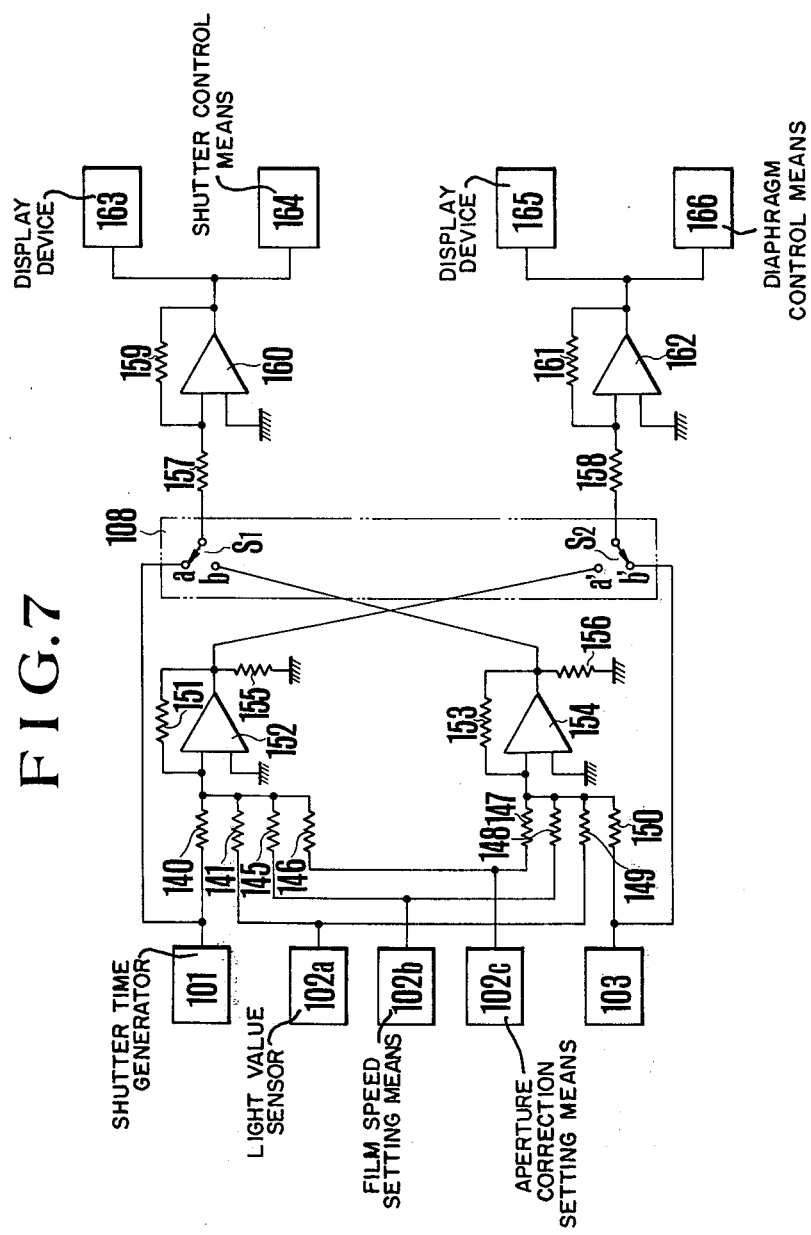
FIG. 7 is a schematic diagram, partially in block form, showing the details of the circuitry of the system of FIG. 6.
Figure 8:
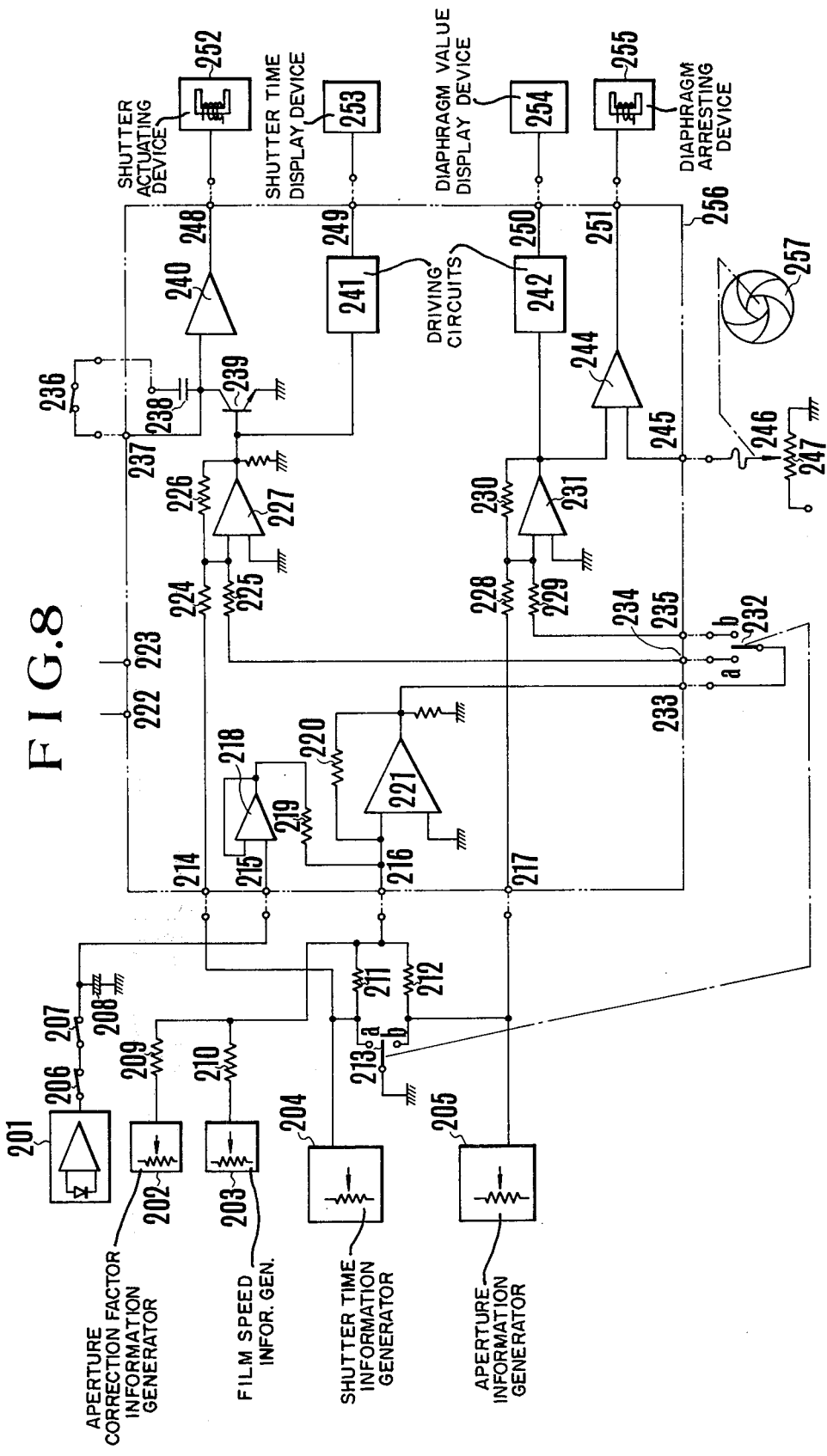
FIG. 8 is a schematic circuit diagram, partially in block form, of a third embodiment of an exposure control system according to the present invention.

FIG. 7 shows the details of the circuitry of those of the various parts of the system of FIG. 8 which have been changed from the first embodiment of the invention. Blocks 101, 102a, 102b, 102c and 103 are identical in circuit construction and arrangement to block 2, 1a, 1b, 1c and 3 of the first embodiment of FIGS. 3 and 4 respectively. The first computer includes an operational amplifier 152 with a feedback resistor 151 connected between the input terminal and the output terminal of amplifier 152 and four balancing resistors 140 through 146 connected parallel to one another between the common input terminal of amplifier 152 and the respective outputs of blocks 101, 102a, 102b and 102c respectively. The output of amplifier 152 is developed across a load resistor 155 serving as a diaphragm control signal ($-Av$). The second computer 105 includes an operational amplifier 154 with a feedback resistor 153 connected between the input terminal and the output terminal of amplifier 154, and four balancing resistors 147 through 150 connected in parallel with one another between the common input terminal of amplifier 154 and the respective output terminals of blocks 102c, 102b, 102a and 103 respectively. The output of amplifier 154 is developed across a load resistor 156 serving as a shutter control signal ($-Tv$).

The operation of the system of FIGS. 6 and 7 is as follows. For making an exposure in the shutter preselection automatic exposure range, the shutter dial is turned to select a desired shutter time, and the diaphragm ring is set to the Auto position. Therefore, the first and second switch elements $S_1$ and $S_2$ are set to their a and a positions. When the shutter button is depressed by a first stroke, a shutter control signal ($-Tv$) from the first generator 101 is applied through a first buffer amplifier 160 to a display device 163 and a shutter control means 164. While the first computer 104 performs computation based on the formula $-Av = -[(Bv' - Avc - Avo) + Sv + Avc + Avo - Tv]$ to produce an output signal which is then applied through a second buffer amplifier 162 to the diaphragm value display device 165 and diaphragm control means 166. Upon further depression of the shutter button to the second stroke, the upward pivoting movement of the reflex mirror, the automatic adjustment of the diaphragm means to a settng and the runningdown movement of the front shutter curtain are initiated in sequence to initiate the exposure.

For making an exposure in the diaphragm preselection automatic exposure range, the diaphragm ring is displaced from the Auto position to select a desired diaphragm aperture value, and the shutter dial is set to the Auto position. Therefore the first and second switch elements $S_1$ and $S_2$ are set to their b and b positions. A diaphragm control signal ($-Av$) is applied through the second buffer amplifier 162 to the display device 165 and diaphragm control means 166. The output signal ($-Tv$) of the second computer 105 obtained by computation based on the formula $-Tv = -[(Bv' - Avc - Avo) + Sv + Avc + Avo - Av]$ is applied through the first buffer amplifier 160 to the display device 163 and the shutter control means 164.

For making an exposure in the manual exposure range, the shutter dial and diaphragm ring are turned to select desired respective values. Thus the first and second switch elements $S_1$ and $S_2$ are set to the illustrated positions, in which neither of the outputs of the first and second computers 104 and 105 can be transmitted through the switch element assembly 108. It is to be noted that the switch element assembly 108 may be constructed from semi-conductor devices as shown in FIG. 2(c).

FIG. 8 shows an example of the circuitry of an exposure control system according to a third embodiment of the present invention. Here the photographic information processing circuit enclosed by dashed lines include a computer circuit and a pair of driving circuits for the display devices. These are adapted for fabrication as one or more integrated circuit units (hereinafter referred to as IC units) usuable as a common component or components for construction of various independent types of cameras such as those including the type provided with two automatically operating ranges and the type provided with only one automatically operating range. Various parts of the circuitry shown outside the dashed line enclosure may take any forms dependent upon the types of cameras. The IC unit 256 has four signal input terminals 214 through 217. The input terminal 215 is adapted for connection to the one plate of a memory capacitor 208. The latter is connected through a manually operable EE lock switch 206 and an automatically operable memory switch 207 to the output terminal of a sensor circuit 201. The input terminal 214 is adapted for connection to the output terminal of a shutter time information generator 204. The input terminal 217 is adapted for connection to the output terminal of a diaphragm aperture information generator 205. The input terminal 216 is adapted for connection to all of the output terminals of an aperture correction factor information generator 202, a film speed information generator 203 and the shutter time and diaphragm aperture information generators 204 and 205 through respective balancing resistors 209 through 212. The IC unit 256 is further provided with four output terminals 248 through 251 adapted for connection with a shutter actuating device having an electromagnet 252, a shutter time display device 253, a diaphragm value display device 254 and a diaphragm arresting device having an electromagnet 255 respectively. Electric power is supplied from a pair of input terminals 222 and 223. A shutter start switch 236 is connectable between input terminals 237 and 238 of the IC unit 256. A variable resistor 246 and 247 constitutes part of a scanning mechanism cooperative with the diaphragm control means having an iris 257. Through an input terminal 245 the scanning mechanism introduces into the IC unit 56, signals with continuously varying magnitudes as the iris 257 is moved from the fully open position to a position for an effective exposure value. A pair of single pole double throw switch elements 213 and 232 are provided for switching the system between the shutter preselection and diaphragm preselection automatic exposure ranges. The first switch element 213 has a movable contact which is grounded and two fixed contacts a and b connected to respective points on the connections between the generator 204 and resistor 211 and between the generator 205 and resistor 212 respectively. The second switch element 232 has a movable contact and two fixed contacts a and b adapted for connection with an output terminal 233 and two input terminals 234 and 235 of the IC unit 256 respectively. The first and second switch elements 213 and 232 are arranged to operate synchronously with each other in a manner similar to that shown in connection with FIG. 2(a).

The circuit in the IC unit 256 includes a high input impedance circuit 218 having the input terminal 215.

An adder 221 with a feedback resistor 220 has an input terminal 216 connected, through a resistor 219, to the output terminal of the circuit 218. A first inverter 227 with a feedback resistor 226 includes an input terminal connected to the input terminals 214 and 234 through respective resistors 224 and 225. A transistor 239 for logarithmic extension has a base electrode connected to the output terminal of inverter 227 and having a collector electrode connected to a timing circuit 240 the output terminal 248. The driving circuit 241 is connected between the output terminal of inverter 227 and the output interconnection terminal 249. The circuit in the IC unit further includes a second inverter 231 with a feedback resistor 230 and an input terminal connected to the interconnection input terminals 217 and 235 through resistors 228 and 229 respectively. A voltage comparator 244 has two input terminals, one of which is connected to the output terminal of inverter 231 and the other of which is connected to the interconnection input terminal 245. The comparator 244 has an output terminal connected to the interconnection output terminal 251, and the driving circuit 242 connected between the output terminal of inverter 231 and the interconnection output terminal 250. When the display devices 253 and 254 are of analog type, the driving circuits 241 and 242 may be omitted.

The operation of the circuit of FIG. 8 is as follows. For making an exposure in the shutter preselection automatic exposure range, the shutter dial is turned to select a desired shutter time, and the diaphragm ring is set to its Auto position. Thus the first and second switch elements 213 and 232 are set to their $b$ positions. When the shutter button is despressed by a first stroke to close a not shown power source switch, the circuit in the IC unit 256 is rendered operative. This causes the adder 221 upon response to the outputs of the sensor 201 and generators 202, 203 and 205 to derive an output signal $(-Av)$ as the result of computation based on the formula $-Av = -[(Bv' - Avc - Avo) + Sv + Avo - Tv]$. This output signal $(-Av)$ is then inverted by the second inverter 231 to a signal $(+Av)$, and is displayed by the display device 254. On the other hand, a signal $(-Tv)$ from the generator 204 is inverted by the first inverter 227 to a signal $(+Tv)$ which is applied to the display device 253. Next, the further depression of the shutter button to the second stroke causes the opening of the memory switch 207, then the initiation of upward pivoting movement of the reflex mirror and then the initiation of closing movement of the iris 257. As the iris 257 is moved from its fully open position, the slider 246 of the variable resistor of the scanning mechanism is slidingly moved to generate ever-varying outputs which are applied through the input terminal 245 to the voltage comparator 244. When a coincidence between the inputs of comparator 244 is effected, the iris 257 which is moving is arrested through the electromagnet 255. Therefore the size of aperture opening is adjusted in accordance with the output of the adder 221. After the termination of upward pivoting movement of the mirror, the shutter start switch 236 is opened causing the front shutter curtain to run down to the fully open position. At the termination of duration of the preselected shutter time, the electromagnet 252 is deenergized causing the rear shutter curtain to run down, thereby the exposure is terminated.

For making an exposure in the diaphragm preselection automatic exposure range, the diaphragm ring is turned from the Auto position to select a desired value, and the shutter dial is set to the Auto position. Thus the first and second switch elements 213 and 232 are set to the $a$ positions. When the shutter button is depressed to the first stroke, the adder 221 derives an output $(-Tv)$ as the result of computation based on the formula $-Tv = -[(Bv' - Tvo - Avc) + Sv + Avo + Avc - Av]$. This output signal $(-Tv)$ after inverted by the first inverter 227 is applied to the display device 253. Upon further depression of the shutter button to the second stroke, a control signal $(-Av)$ from the generator 205 after inverted by the second inverter 231 is applied to the voltage comparator 244 to adjust the iris to a setting in a manner similar to that described in connection with the shutter preselection exposure range. Then, the switch 236 is opened to initiate the exposure. At the termination of duration of a timed interval dependent upon the resistance value of transistors 239 and the capacitance of the timing capacitor 238, the timing circuit 240 is inverted to deenergize the solenoid of electromagnet 252. Therefore the rear shutter curtain is caused to run down to the blocking position.

For making an exposure in the manual exposure range, the shutter dial and diaphragm ring are turned to select desired respective values. Thus the first and second switch elements 231 and 232 are set to the illustrated position in which the signals $(-Tv)$ and $(-Av)$ from the generators 204 and 205 are directly applied to the first and second inverter 229 and 231 respectively. The subsequent operation proceeds in a manner similar to that shown in connection with the automatic exposure range.

Figure 9:
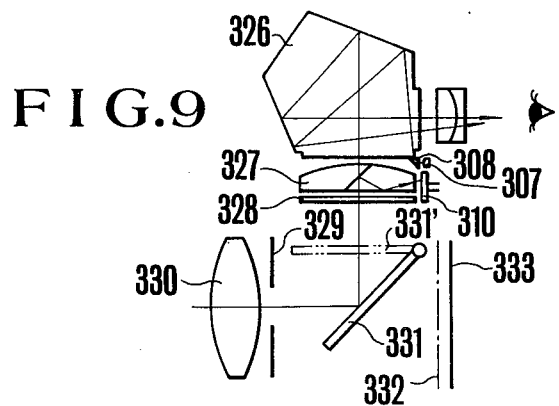
FIG. 9 is a schematic sectional view of the essential parts of the finder optical system of a single lens reflex camera employing the exposure control system of the invention.

FIG. 9 is a sectional view of the essential parts of a single lens reflex camera, showing an example of arrangement of a photosensitive element and display devices of the exposure control system of the present invention in or adjacent the optical system of the camera finder. At the front of the camera, there is an objective lens 330 with an iris diaphragm 329. At the rear of the camera, are shutter curtains 332 and a film 333. A reflex mirror 331 is positioned in a space between the objective lens 330 and the shutter curtains 332 to reflect light entering through the lens 330 upward onto a focusing screen 328 on which an image of an object being photographed is formed. Light from the image is radiated upward through a condenser lens 327 into a pentaprism 326 and therefrom directed towards an eye-piece, reaching an eye of the photographer looking through the finder. At one side of the condenser lens 327, a photosensitive element 310. A display means 307 is positioned adjacent a supplementary prism 308 to provide the display in the field of view of the finder.

Figure 12A:
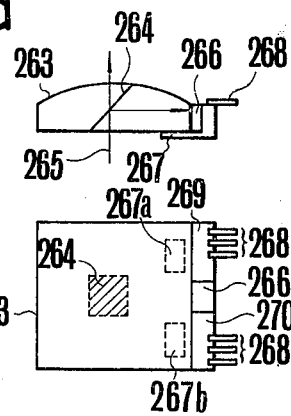
FIG. 12(a) is a fragmentary sectional view of the finder optical system of FIG. 9 provided with display means and integrated circuit units of FIG. 8 arranged adjacent the condenser lens thereof.
Figure 12B:
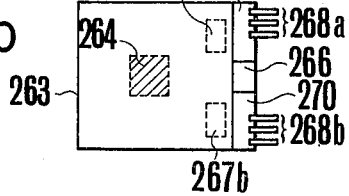
FIG. 12(b) is a top plane view of the arrangement of FIG. 12(a).

In the case of the system of FIG. 8, it is possible to locate the IC unit 256 adjacent the condenser lens 263 of the finder as shown in FIGS. 12a and 12b, wherein 264 is a half-mirror arranged in the condenser lens 263. A photosensitive element 266, shutter time and diaphragm value display device 267a and 267b and IC units 269 and 270 are arranged adjacent with each other and at one side of the condenser lens 266. This arrangement has advantages of simplifying the wiring and of reducing the bulk of the system.

Figure 10:
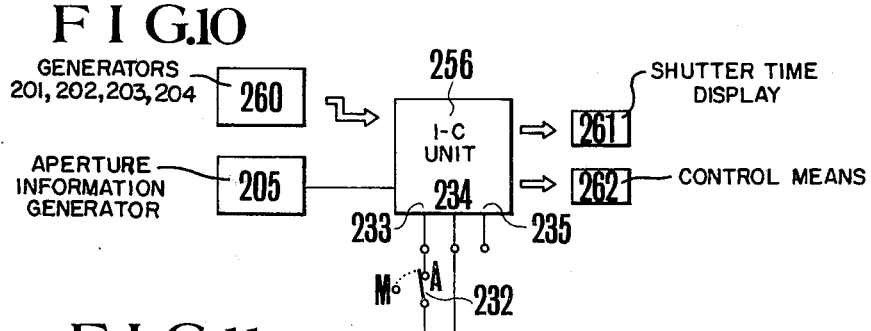
FIGS. 10 and 11 are block diagrams showing two examples of modification of the circuit of FIG. 8 in a manner to be usuable with a camera of the type provided with a diaphragm preselection automatic exposure range alone and to a camera of the type provided with a shutter preselection automatic exposure range alone respectively.
Figure 11:
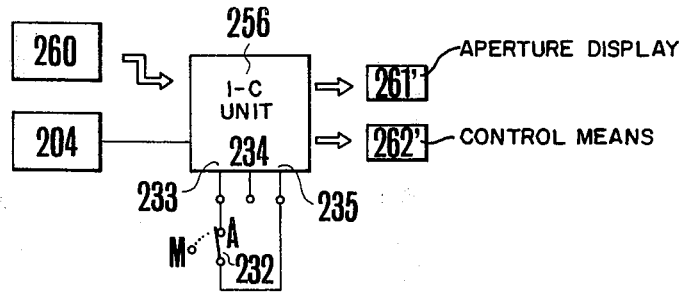

FIGS. 10 and 11 schematically show two examples of application of the IC unit 256 of FIG. 8 to cameras of the types provided with only one automatically operating range, namely, the diaphragm preselection automatic exposure range and the shutter preselection automatic exposure range respectively. In FIG. 10, a block 260 is assumed to include the sensor circuit 201, aperture correction factor information generator 202, film speed information generator 203 and shutter time information generator 204 of FIG. 8. In FIG. 11, a block 260 is assumed to include the sensor circuit 201, the generators 202 and 203 and diaphragm aperture information generator 205. In FIGS. 10 and 11, blocks 204 and 205 correspond to the shutter time and diaphragm aperture information generators of FIG. 8 respectively. The IC unit 256 is identical in construction and arrangement to that of FIG. 8. Blocks 261 and 262 are shutter time display and control means respectively, and blocks 261' and 262' are diaphragm aperture display and control means respectively. A switch 232 is provided for switching the system between the automatic and manual exposure ranges.

Figure 13:
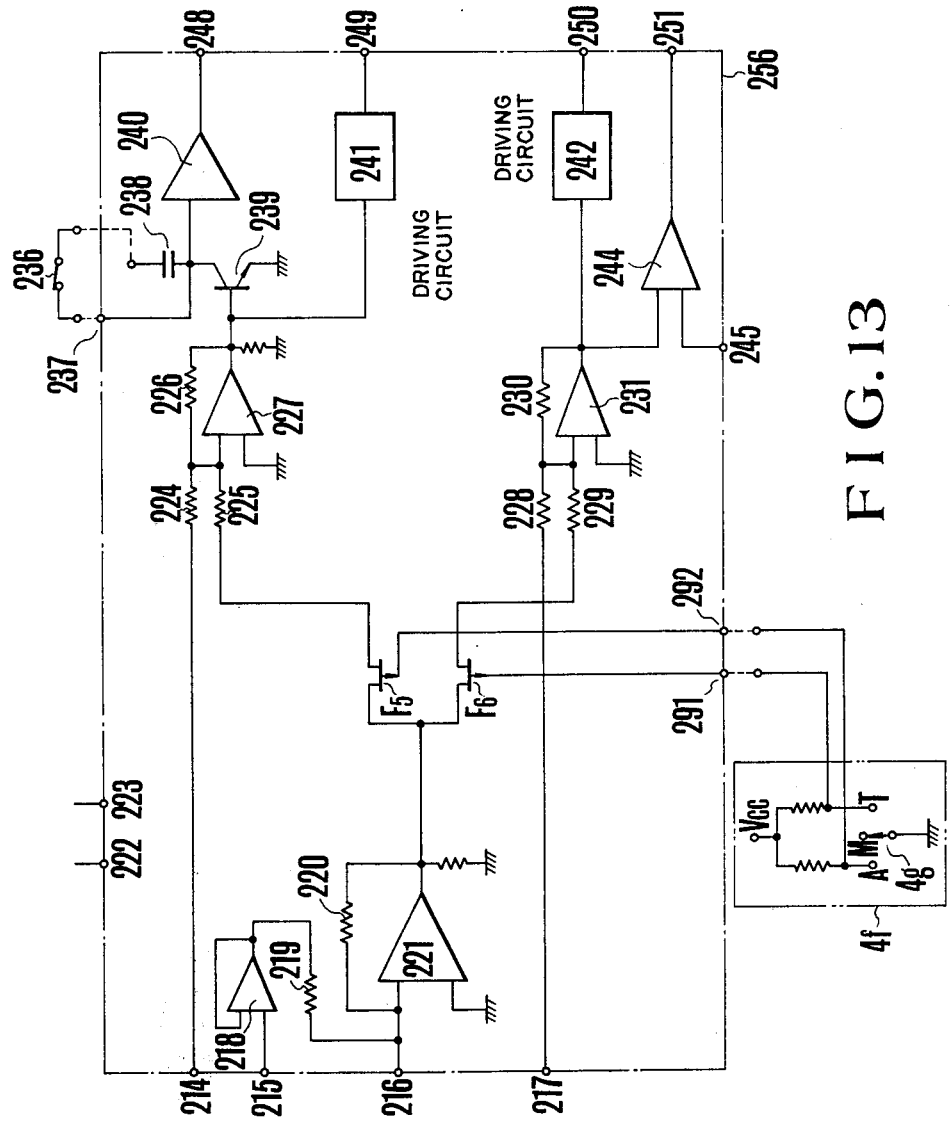
FIG. 13 is a fragmentary schematic circuit diagram, partially in block form, showing an example of modification of the third embodiment of FIG. 8.

FIG. 13 shows an example of modification of a third embodiment of the invention shown in FIG. 8. The second mechanical switch 232 which is located outside of the IC unit in the third embodiment is modified with use of a pair of field-effect transistors F5 and F6 as incorporated in the IC unit. The source electrodes of transistors F5 and F6 are connected to the common output terminal of the adder 221, and their drain electrodes are connected through respective resistors 225 and 229 to the respective input terminals of the first and second inverters 227 and 231. The substrate electrodes of transistors F5 and F6 are connected to respective interconnection terminals 292 and 291 adapted for connection with the fixed contacts A and T of the change-over switch 4f located outside of the IC unit 256. The fixed contacts A and T are connected through respective resistors to a potential source Vcc, and the movable contact 4g is grounded, so that when the movable contact 4g is in engagement with the fixed contact T, or A, the transistor F5 is in "off" state and the transistor F6 is on state, or the vice versa respectively.

It will be appreciated that the third embodiment of the invention in FIG. 8 provides the possibility of using only one type of IC units as a common component in constructing various independent types of exposure control apparatus. This is very advantageous for the individual camera makers who produces a wide variaty of cameras amenable to a relatively low cost unit production techniques.

What is claimed is:

1. An exposure control system for a camera of the type provided with a shutter preselection automatic exposure range and with a diaphragm preselection automatic exposure range, compising;
  a. shutter time information generating means for generating an analog signal corresponding to a preselected shutter time value,
  b. diaphragm aperture information generating means for generating an analog signal corresponding to a preselected diaphragm aperture value,
  c. light value sensor means for generating an analog signal corresponding to the level of brightness of a scene being photographed,
  d. selecting means having a plurality of switched positions including a first position for said shutter preselection and a second position for said diaphragm preselection automatic exposure range,
  e. first switching means cooperative with said selecting means and having two input terminals connected to the respective output terminals of said shutter time information generating means and said diaphragm aperture information generating means upon setting of said selecting means to either said first or said second position for causing either said shutter time dependence analog signal or said diaphragm aperture dependence analog signal to exit therefrom,
  f. computer circuit means responsive to the outputs of a least said light value sensor means and said first switching means for deriving an exposure value,
  g. second switching means cooperative with said selecting means and having three input terminals connected to the respective output terminals of said shutter time information generating means, said diaphragm aperture information generating means and said computer circuit means, and having first and second output terminals from which shutter control and diaphragm aperture control analog signals exit respectively,
  h. shutter time control means having an input terminal connected to said first output terminal of said second switching means for controlling the period of actuation of the shutter of said camera, and
  i. diaphragm control means having an input terminal connected to said second output terminal of said second switching means for controlling the size of aperture of the diaphragm means of said camera.

2. An exposure control system according to claim 1, wherein said light value sensor means is provided with a light value sensing circuit for generating an analog signal corresponding to the intensity of light coming from said scene and entering through an objective lens of said camera and with store means for storing said analog signal.

3. An exposure control system according to claim 1, further comprising:
  a. film speed information generating means for generating an analog signal corresponding to a selected film speed, said film speed information generating means being connected to the input terminal of said computer circuit means, and
  b. aperture corresponding factor information generating means for generating an analog signal corresponding to the maximum relative aperture ratio of an objective lens of said camera, said aperture correction factor information generating means being connected to the input terminal of said computer circuit means.

4. An exposure control system according to claim 1, further comprising;
  a. shutter time displaying means connected to said first output terminal of said second switching means for displaying an effective exposure time; and
  b. diaphragm aperture displaying means connected to said second output terminal of said second switching means for displaying an effective exposure aperture.

5. an exposure control system according to claim 1, wherein said first switching means has a circuit-transfer switch element having a grounded movable contact cooperative with said selecting means in such a manner that when said selecting means is set to said first position, the output signal from said diaphragm aperture information generating means is grounded, when said selecting means is set to said second position, the output signal from said shutter time information generating means is grounded.

6. An exposure control system according to claim 1, further comprising first and second resistance means connected between the output terminal of said shutter time information generating means and the corresponding input terminal of said second switching means and between the output terminal of said diaphragm aperture information generating means and the corresponding input terminal of said second switching means respectively.

7. An exposure control system according to claim 1, wherein said shutter time information generating means has a variable resistor portion adapted to produce an analog signal corresponding to a preselected shutter time and a signal blocking position incapable of producing any analog signal.

8. An exposure control system according to claim 6, wherein said signal-blocking portion is grounded.

9. An exposure control system according to claim 1, wherein said selecting means has a change-over switch element associated with a substantially constant potential source for causing electrical signals of different potential level from each other to exit therefrom selectively, and said first swiching means is constructed from a semi-conductor device having a gating control input terminal connected to the output terminal of said change-over switch element, thereby the conduction of said semi-conductor device is controlled by the potential level of said electrical signal.

10. An exposure control system according to claim 9, wherein said semi-conductor device comprises a plurality of field-effect transistors.

11. An exposure control system for a camera of the type provided with a shutter preselection automatic exposure range and with a diaphragm preselection automatic exposure range, comprising;
 a. shutter time information generating means for generating an analog signal corresponding to preselected shutter time value,
 b. diaphragm aperture information generating means for generating an analog signal corresponding to a preselected diaphragm aperture value,
 c. light value sensor means for generating an analog signal corresponding to the level of brightness of a scene being photographed,
 d. first computer circuit means responsive to the outputs of at least said light value sensor means and said shutter time information generating means for deriving an exposure value,
 e. second computer circuit means responsive to the outputs of at least said light value sensor means and said diaphragm aperture information generating means for deriving an exposure value,
 f. switching means having four input terminals connected to respective output terminals of said shutter time information generating means, said diaphragm aperture information generating means, and said first and said second computer circuit means and having first and second output terminals from which a shutter control analog signal and diaphragm control analog signal exit respectively,
 g. shutter control means responsive to the output appearing at said first output terminal of said switching means for controlling the period of actuation of the shutter of said camera, and
 h. diaphragm control means responsive to the output appearing at said second output terminal of said switching means for controlling the size of aperture of the diaphragm of said camera.

12. In an exposure control apparatus for a camera, an integrated circuit unit comprising;
 a. a shutter time information input terminal adapted to be receptive of an analog signal corresponding to a preselected shutter time value,
 b. a diaphragm aperture information input terminal adapted to be receptive of an analog signal corresponding to a preselected diaphragm aperture value,
 c. a selected photographic information input terminal adapted to be receptive of either of the signals corresponding to said preselected shutter time value and said preselected diaphragm aperture value,
 d. a light value information input terminal adapted to be receptive of an analog signal corresponding to the level of brightness of a scene being photographed,
 e. a computer circuit responsive to the outputs from said light value information input terminal and said selected photographic information input terminal for deriving an exposure value,
 f. a first output terminal connected to the output terminal of said computer circuit,
 g. a first signal input terminal adapted to be receptive of an output signal from said first output terminal,
 h. a second signal input terminal adapted to be receptive of an output signal from said first output terminal,
 i. a shutter control circuit responsive to said shutter time dependence analog signal and the output of said computer circuit supplied through said second signal input terminal for producing a control signal capable of controlling the period of actuation of the shutter of said camera,
 j. a diaphragm control circuit responsive to said diaphragm aperture dependence analog signal and the output of said computer circuit supplied through said first input terminal for producing a control signal capable of controlling the size of aperture of the diaphragm of said camera,
 k. a second output terminal connected to the output terminal of said shutter control circuit, and
 l. a third output terminal connected to the output terminal of said diaphragm control circuit.

13. An exposure control apparatus according to claim 12, wherein said integrated circuit unit is further provided with;
 a. a drive circuit connected to said shutter control circuit for producing an output capable of driving shutter time value displaying means, and
 b. a second drive circuit connected to said diaphragm control circuit for producing an output capable of driving diaphragm aperture value displaying means.

14. An exposure control apparatus according to claim 12, wherein said diaphragm control circuit is provided with a voltage comparator circuit receptive of electrical signals with magnitudes corresponding to ever-varying sizes of actual aperture of said diaphragm of said camera.

15. An exposure control apparatus according to claim 12, wherein said shutter control circuit is provided with a timing circuit.

16. An exposure control apparatus according to claim 12, wherein said integrated circuit unit is located adjacent a focusing screen of the finder of said camera.

17. In an exposure control apparatus for a camera, an integrated circuit unit comprising;
   a. a shutter time information input terminal adapted to be receptive of an analog signal corresponding to a preselected shutter time value,
   b. a diaphragm aperture information input terminal adapted to be receptive of an analog signal corresponding to a preselected diaphragm aperture value,
   c. a selected photograhic information input terminal adapted to be receptive of either of the signals corresponding to said preselected shutter time value and said preselected diaphragm aperture value,
   d. a light value information input terminal adapted to be receptive of an analog signal corresponding to the level of brightness of a scene being photographed,
   e. a computer circuit responsive to the outputs from said light value information input terminal and said selected photographic information input terminal for deriving an exposure value,
   f. a semi-conductor switching circuit connected to the output terminal of said computer circuit for causing the output signal from said computer circuit to exit from selected one of at least first or second output terminals thereof,
   g. a first input terminal connected to the gating control input terminal of said semi-conductor switching means and adapted to be receptive of a control signal for said semi-conductor switching means for the outside of said integrated circuit unit,
   h. a shutter control circuit responsive to said shutter time dependence analog signal and the output of said computer circuit supplied through said first output terminal of said semi-conductor switching means for producing a control signal capable of controlling the period of actuation of the shutter of said camera,
   i. a diaphragm control circuit responsive to said diaphragm aperture dependence analog signal and the output of said computer circuit supplied through said second output terminal of said semi-conductor switching means for producing a control signal capable of controlling the size of aperture of the diaphragm of said camera,
   j. a first output terminal connected to the output terminal of said shutter control circuit, and
   k. a second output terminal connected to the output terminal of said diaphragm control circuit.

* * * * *